(12) United States Patent
Labrie et al.

(10) Patent No.: US 8,093,442 B2
(45) Date of Patent: Jan. 10, 2012

(54) ELECTROCHEMICAL REMOVAL OF DISSOCIABLE CYANIDES

(75) Inventors: Jacques Labrie, Chicoutimi (CA); Hugues Menard, Sherbrooke (CA)

(73) Assignee: Rio Tinto Alcan International Limited, Montreal (CA)

( * ) Notice: Subject to any disclaimer, the term of this patent is extended or adjusted under 35 U.S.C. 154(b) by 751 days.

(21) Appl. No.: 12/176,131

(22) Filed: Jul. 18, 2008

(65) Prior Publication Data

US 2009/0030256 A1 Jan. 29, 2009

Related U.S. Application Data

(60) Provisional application No. 60/951,385, filed on Jul. 23, 2007.

(51) Int. Cl.
*A62D 3/115* (2007.01)
(52) U.S. Cl. ................ 588/303; 588/405; 588/410
(58) Field of Classification Search ............ 588/303, 588/313, 318, 401, 405, 408, 410, 413, 901
See application file for complete search history.

(56) References Cited

U.S. PATENT DOCUMENTS

| 2,773,025 A | 12/1956 | Ricks et al. | |
|---|---|---|---|
| 3,715,308 A | 2/1973 | Sulfaro et al. | |
| 3,766,037 A * | 10/1973 | Lee | 588/303 |
| 3,816,275 A | 6/1974 | Ichiki et al. | |
| 4,042,502 A | 8/1977 | Schmidt et al. | |
| 4,383,901 A * | 5/1983 | Smith et al. | 588/303 |
| 4,417,963 A | 11/1983 | Janne | |
| 4,436,601 A * | 3/1984 | Branchick et al. | 588/302 |
| 5,256,313 A | 10/1993 | Crafton | |
| 7,144,514 B2 | 12/2006 | Vuong et al. | |

FOREIGN PATENT DOCUMENTS

CA  2 388 987  5/2001

OTHER PUBLICATIONS

International Search Report in related International patent application No. PCT/CA2008/001347, dated Oct. 10, 2008.

* cited by examiner

*Primary Examiner* — Edward Johnson
(74) *Attorney, Agent, or Firm* — Banner & Witcoff, Ltd.

(57) ABSTRACT

The method of the invention provides means of destroying highly stable metal cyanide ions found in a solution, and converting the cyanide to harmless by-products. Contrary to conventional methods which merely complex the cyanide into a mechanically or physically removable complex, the present method destroys the cyanide found in the sample. The invention is directed to a method of destroying cyanide comprising providing a highly alkaline solution containing a metal cyanide ions; and subjecting the solution to electro-oxidation.

12 Claims, 2 Drawing Sheets

ELECTROCHEMICAL REMOVAL OF DISSOCIABLE CYANIDES

FIELD OF INVENTION

The method of the invention provides means of destroying highly stable metal cyanide ions found in a solution, and converting the cyanide to harmless by-products. Contrary to conventional methods which merely complex the cyanide into a mechanically or physically removable complex, the present method destroys the cyanide found in the sample. By judicious selection of the anode, the pH during electro-oxidation, and furthermore preferably by selecting the applied current density, the inventors have developed conditions necessary to destroy the cyanide.

BACKGROUND OF THE INVENTION

In various industries, such as aluminum smelters, high amounts of spent potlining or other leachates are contaminated with stable metal cyanides, typically compounds containing the ferro-cyanide complex ions. The management of these industrial by-products is expensive requiring secure containment mechanisms to prevent cyanide leachate migration or runoff. This is of grave environmental concern to the inventors and to society at large. The present invention consists of destroying CN contained in these compounds, by electrochemical oxidation in an inexpensive and energetically economical manner.

U.S. Pat. No. 3,816,275 describes a process for the treatment of waste liquors containing a cyano-complex such as ferricyanide by electrolysing the liquor using an iron anode thereby forming ferrocyanide or a ferricyanide ion containing complex salt, both of which form a blue colloid of Prussia Blue and surface in the liquor to form a scum which is separable from the remaining of the waste liquor.

WO 01/62993 describes a process for recovery of cyanide by electrochemical dissociation of the metal-cyanide complex and electrowinning of the metal while the free cyanide generated in the process is recovered in a membrane.

Szpyrkowicz et al. (Annali di Chimica, 93, 2003) describes electrochemical oxidation to destroy cyanide in wastewaters of copper plating, using various anode materials (Ti/Pt, Ti with various oxides, and stainless steel) anode and stainless steel cathode in alkaline solution. The presence of a copper oxide on the anode is postulated.

Wo 98/18982 describes an alkaline electrolytic bath for transformation of a cyanidric brass bath into a non-cyanidric one, thereby allowing the deposition of brass without contamination of the washing waters with cyanide.

Furthermore, there is extensive literature on the recovery of cyanide for metal plating or gold production or relating to the destruction of $CN^-$ ion. However, the present invention is suitable for the destruction of the more stable metallic cyanide complexes, as well as the $CN^-$ ion.

SUMMARY OF THE INVENTION

The invention is directed to a method of destroying cyanide comprising providing a solution containing a complex metal cyanide ions, said solution being at a pH between 9 and 11.5; and subjecting the solution to electro-oxidation in an electrolysis cell, said cell comprising a metal anode and a metal cathode, wherein said metal anode comprises copper.

In particular the invention is directed to a method of destroying cyanide where the complex metal cyanide ion is a ferrocyanide ion.

For optimal results, the electro-oxidation is performed at an applied anode current density of from between 1.5 and 7.5 $mA/cm^2$. If required, prior to subjecting the solution to electro-oxidation, the method comprises an intermediate step comprising adjusting the pH of the solution to a pH between 9 and 11.5 by adding an acid or a base to said solution.

GENERAL DESCRIPTION OF THE INVENTION

Figure 1:
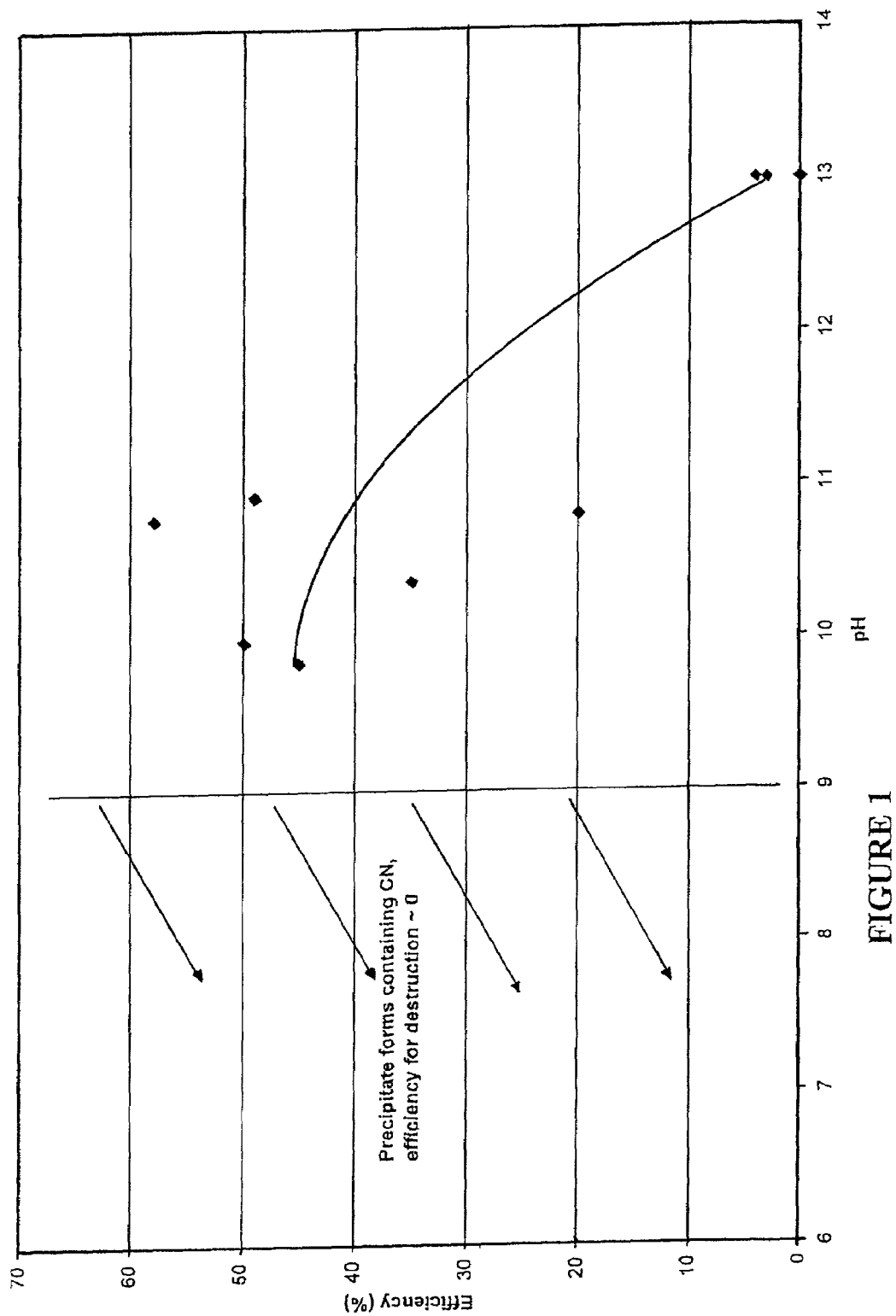
FIG. 1 is a plot of the efficiency against the average pH at a current density of 5.2 $mA/cm^2$.

The term "destroying cyanide" is intended to mean oxidizing cyanides or cyanates, present in ionic or complexed form, such as complexed with a metal into a non-cyanidric product. Accordingly, the term "cyanide" is intended to mean cyanide, cyanides or cyanates, present in ionic or complexed form, such as complexed with a metal. The term "non-cyanidric" is intended to mean the absence of cyanide or cyanate ions or complexes thereof with metals or non-metals. The term "destroying cyanide", alternatively expressed, is intended to mean the decomposition of the carbon from nitrogen in cyanide. The invention is directed to removing cyanide present in ionic or complexed form from a medium.

Typically, the method of the invention relates to destroying metal cyanide complex ions from a medium. Metal cyanide complexes typically are of the formula $(Metal)[CN]_y$.

Metal cyanides wherein the metal is selected from the group consisting of Fe, Cd, Ni, Ag, Cu, and Au are anticipated by the present inventors. Metal cyanides wherein the metal comprises iron are considered a particularly interesting embodiment of the invention. Metal cyanide complexes are more difficult to destroy electrochemically than uncomplexed cyanide ions, and certain metal cyanides, most notably the ferro-cyanide ion $(Fe[(CN)_6])^{3-}$ has heretofore proven particularly difficult to destroy in an efficient manner.

The electro-oxidation of the invention works efficiently at high and at low metal cyanide complex concentrations within the solution. Typically, leachates from spent potlining from aluminum smelters have a ferro-cyanide concentration of about 1000 ppm and the method of the invention has been found to be effective at this concentration. Conversely, leachates can have concentrations of as low as 50 or 100 ppm, and the method of the invention is nonetheless suitable. In these examples, the cyanide is measured as "distillable cyanide", using Standard Methods for Wastewater, 1992, 18th Edition, Method 4500-$CN^-$ C.

Without being bound to a particular theory, it is postulated that the destruction of cyanide by the method of the invention follows the oxidation reaction mechanism (not balanced for electrons).

At the anode, the complex metal cyanide is first electro-oxidized to the metal ions and cyanate ion at the anode.

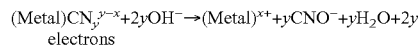

The cyanate ions are subsequently further electro-oxidized to non-cyanidric compounds at the anode.

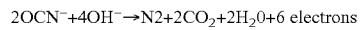

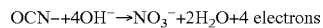

Any free cyanide ions will also be electro-oxidized at the anode, initially to cyanate, then to non-cyanidric compounds.

$$CN^- + 2OH^- \rightarrow OCN^- + H_2O + 2 \text{ electrons}$$

The nitrate ions are then electro-reduced at the cathode to either nitrite or ammonia and hydroxide ions $$NO_3^- + H_2O + 2 \text{ electrons } NO_2^- + 2OH^-$$

$$NO_3^- + 6H_2O + 8 \text{ electrons} \rightarrow NH_3 + 9OH^-$$

The first step is particularly difficult to accomplish for stable metal cyanide complexes such as ferro-cyanide and, in general, oxygen is generated at the anode preferentially to the destruction of the ferro-cyanide complex. The term "cyanidric" is understood to include metal cyanides (such as (Metal) $CN_y^{y-x}$) and cyanates (such as $yCNO^-$). The term "non-cyanidric" is understood to mean that the solution is essentially free of metal cyanides or cyanates (i.e. there is an absence of metal cyanides or cyanates).

As can be seen from the reaction mechanism, relatively benign products, in terms of environmental, toxicity and handling concerns, result from the method of the invention.

The electro-oxidation of a metal cyanide complex proceeds at the anode. The electro-oxidation proceeds in several steps, resulting in the formation of a $CNO^-$ ion. The $CNO^-$ ion as well as any free $CN^-$ that may be present is readily electro-oxidized in alkaline solutions to form the harmless by-products. The metal cyanide complex does not easily oxidize except at least under the pH (and current density) conditions of the method of the invention. Therefore, in a preferred embodiment of the invention, the electro-oxidation is performed at least with a solution having an alkaline pH, typically between 9 and 11.5.

The method of electro-oxidation of the invention is made possible by the formation of a stable passivation layer on the anode surface, and operating under conditions where the metal cyanide complex is least stable. Accordingly, important features of the invention include the use of an anode comprising copper for the electro-oxidation and conditions which provide for the formation of a stable Cu containing passivation layer on the copper of the metal anode.

Accordingly, the present inventors have found that metal cyanide complexes can be electro-oxidized in a media with a pH between 9 and 11.5 by the use of an anode comprising copper under conditions which provide for the formation of a stable Cu containing passivation layer on the copper of the metal anode. The conditions of the method of the invention are such that a stable Cu containing passivation layer is formed at the copper anode.

The inventors have discovered that with anodes not comprising copper, the over-potential for metal cyanide oxidation is higher and the production of oxygen from water electrolysis dominates. For instance, in the event Fe is used at the anode, the Fe anode is consumed and a complex Fe—FeCyanide precipitates. This removes the ferrocyanide from the solution but does not destroy the cyanide.

Furthermore, the inventors have discovered that even for anodes comprising copper, if operated under less alkaline conditions (e.g. pH less than 9), the ferrocyanide forms a complex Cu—FeCyanide precipitate. As in the case of Fe anodes, this removes the ferrocyanide from the solution but does not destroy the cyanide.

Accordingly, for the electro-oxidative destruction of cyanide of the present invention, the metal anode comprises copper and the electro-oxidation is performed under conditions to provide the formation of a stable Cu containing passivation layer on the copper of the metal anode. The metal anode is selected from the group consisting of a solid Cu electrode, Cu in the form of a wire mesh, Cu in the form of reticulated foam, and any metal comprising a Cu laminate or Cu layer. For example, the anode may be iron or steel laminated or coated with copper. Solid Cu electrodes can further be modified by etching, sand blasting, machining to increase the effective surface area for electrolysis.

The conditions so as to provide the formation of a CuO layer on the copper of the metal anode are preferably the use of an applied anode current density of from between 1.0 and 8 mA/cm². The electro-oxidation is typically performed at an applied anode current density of from between 1.0 and 7.5 mA/cm² such as from between 1.0 and 7 mA/cm², more preferably from between about 1.5 and 6 mA/cm², more preferably from between about 1.0 and 5.5 mA/cm². If the current density is less than about 1.0 mA/cm², the over-potential is insufficient to form a stable Cu containing passivation layer. Furthermore, in the absence of a passivation layer, the copper anode dissolves in the alkaline solution. An over-potential electrolyses water to form oxygen which is in competition with the destruction of the metal cyanide complex if the anode current density exceeds the maximum ranges listed above.

As stated, a judicious selection of the alkalinity of the solution is required for the efficient destruction of the cyanide. Accordingly, the method of the invention optionally comprises, prior to subjecting the solution to electro-oxidation, an intermediate step comprising adjusting the pH of the solution by adding an acid or a base to said solution. Depending on the source of the cyanide-containing solution, it may have a pH between 5 and 14, typically between 6 and 14 for a solution comprising metal cyanide complexes. In the event the solution has a pH of less than 9, the pH of the solution is adjusted to between 9 and 11.5, typically adjusted to between about 9.5 and 11.5, preferably between about 10 and 11. Similarly, in the event the pH of the solution is less than about 10, it is typically adjusted to between about 10 and 11. The pH is adjusted by the use of a base, such as NaOH or KOH.

In the event the solution has a pH of more than about 11.5, the pH is adjusted to between 9.5 and 11.5, and preferably to between about 10 and 11. The pH is adjusted using an acid, preferably a weak acid, which may be selected from the group consisting of phosphoric acid, and organic acids. Suitable organic acids include acetic or citric acids.

Without being bound to a particular theory, the selected current density favours the formation of a stable passivation layer on the surface of the Cu anode. The passivation layer will contain CuO, but in the presence of organic acids or other weak acids such as phosphoric acid, will contain compounds of Cu and the anion of the acid (for example acetate, citrate or phosphate). It is believed that these anions further stabilize the passivation layer, whereas anions of many strong mineral acids (for example HCl) have a negative effect on the stability of the passivation layer. The presence of a stable passivation layer over a wide voltage range ensures that the electro-oxidation of the cyanides can occur at a lower potential than that required for oxygen generation, thus ensuring that the cyanides can be destroyed efficiently.

Without being bound to a particular theory, the metal cyanide complex stability is lower at a lower pH and therefore would electro-oxidize to the cyanate intermediate at a lower potential. However, at a lower pH, there is also tendency to form Cu-metal cyanide precipitates. Therefore in order to achieve destruction of the metal cyanide into non-cyanidric components, the pH of the solution must be carefully selected.

The metal cathode can be of any metal or conductive material which is not soluble in alkaline solutions, typically selected from the group consisting of iron, steel, stainless steel, titanium, copper, or carbon/graphite. A particular suitable embodiment is one wherein the metal cathode is an iron cathode. At the cathode, the metal ions produced by the metal cyanide ion oxidation are neutralized to metal. Under certain conditions, hydrogen may also be generated at the metal cathode by water electrolysis.

The term "solution containing a metal cyanide or cyanide ions" is intended to mean a solution comprising complexed metal cyanides, cyanide salts or cyanates, or ionized cyanides or cyanates. The solution, sample or medium comprising the free or metallic complexes of cyanide can be from any number of sources, such as leachates from plating or smelting processes. In one suitable embodiment, the solution is the spent potlining leachates from aluminium smelters. Leachates from spent potlining contains high concentrations of cyanides, particularly ferro-cyanides. Obviously, this is of great environmental concern, particularly for underground and surface water. After electrochemical oxidation by the method of the present invention, the leachate is decontaminated and can be released to the environment.

In a suitable embodiment, a leachate solution is provided having pH between 10 and 13. The solution is treated with acid, preferably a weak acid to bring the pH of the solution to between 10 and 11. The solution is subjected to electrolysis in a cell comprising a metal anode comprising copper. A current density of 1 to 7 mA/cm$^2$ is applied. A further advantage of the invention is the economic efficiency of the method due to inexpensive materials and low energy requirements.

EXAMPLES

Example 1

A synthetic solution of potassium ferrocyanide in water was prepared at different cyanide levels (20 ppm. 100 ppm and 500 ppm). The solution was adjusted to various pH levels between 9 and 11.5 and, as a negative control for comparative purposes, at an entrance pH of 13. The pH-adjusted solution was electrolysed in a flow through laboratory cell at various current densities. Because of the small scale of the experiment, and lack of buffering in the solution, the pH varied from the cell entrance to the exit. The results are shown in Table 1. The results demonstrate a dramatic increase in efficiency in the claimed pH range compared to at pH 13.

The efficiency was plotted vs average pH for a current density of 5.2 mA/cm$^2$. The results and a second order polynomial trendline are shown in FIG. 1, indicating a peak in efficiency at the preferred pH.

Figure 2:
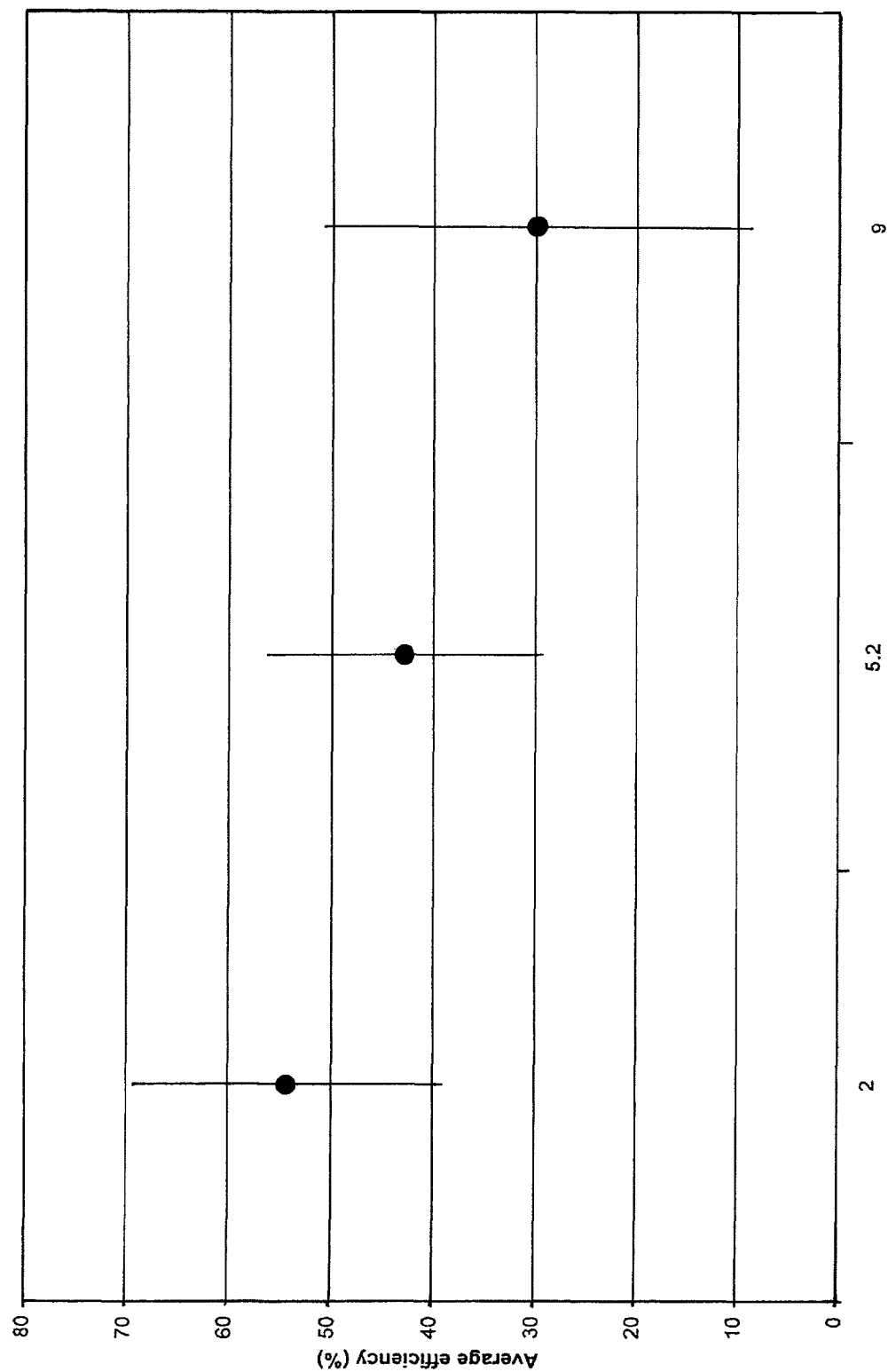
FIG. 2 is a plot of the average efficiency against current density at three levels of initial cyanide concentration at pH between 9 and 11.5.

The average efficiency was plotted vs current density for the three levels of initial cyanide concentration for runs at the preferred range of average pH (between 9 and 11.5). The results are shown in FIG. 2, indicating a significant loss of efficiency at the higher current densities and a generally maximum efficiency within the preferred current density range.

TABLE 1

| Current density (mA/cm$^2$) | Initial CN (ppm) | pH[1] | Efficiency | pH[1] | Efficiency | pH[1] | Efficiency |
|---|---|---|---|---|---|---|---|
| 2 | 500 | | | 11.2 | 32% | 10.2 | 41% |
|  | 100 | | | 10.7 | 49% | 10.3 | 69% |
|  | 20 | | | 10.9 | 68% | 10.1 | 35% |
| 5.2 | 500 | >13 | 3% | 10.9 | 49% | 10.4 | 35% |
|  | 100 | >13 | 4% | 10.8 | 58% | 9.8 | 45% |
|  | 20 | >13 | 0% | 11.1 | 68% | 9.9 | 63% |

[1]Average pH. The pH increases during the process.

The invention claimed is:

1. A method of destroying cyanide comprising:
   providing a solution containing metal cyanide ions, said solution being at a pH between 9 and 11.5; and
   subjecting the solution to electro-oxidation in an electrolysis cell thereby destroying the metal cyanide ions and forming non-cyanidric compounds,
   said cell comprising a metal anode and a metal cathode, wherein said metal anode comprises copper, and wherein the electro-oxidation is performed under conditions to provide the formation of a Cu containing passivation layer on the copper of the metal anode.

2. The method according to claim 1, wherein said Cu containing passivation layer is a compound or complex selected from one or more of a compound or complex of Cu and oxygen; or a compound or complex of Cu and the anion of a weak acid.

3. The method according to claim 1, wherein the electro-oxidation is performed at an applied anode current density of from between 1.0 and 7.5 mA/cm$^2$.

4. The method according to claim 3, wherein the electro-oxidation is performed at an applied anode current density of from between 1.0 and 7 mA/cm$^2$.

5. The method according to claim 1, wherein the metal anode is selected from the group consisting of a solid Cu electrode, an electrode comprising Cu in the form of a wire mesh, an electrode comprising Cu in the form of a reticulated foam, and a metal comprising a Cu laminate or Cu layer.

6. The method according to claim 1, wherein the metal cathode is selected from the group consisting of a metal or conductive material which is not soluble in alkaline solutions.

7. The method according to claim 6, wherein the metal cathode is selected from the group consisting of iron, steel, stainless steel, titanium, copper, and carbon/graphite.

8. The method according to claim 7, wherein the metal cathode is iron.

9. The method according to claim 1, wherein prior to subjecting the solution to electro-oxidation, said method comprises an intermediate step comprising adjusting the pH of the solution to a pH between 9 and 11.5 by adding an acid or a base to said solution.

10. The method according to claim 8, wherein the pH of the solution is adjusted to from about 10 to about 11.

11. The method according to claim 9, wherein the pH of the solution is adjusted from a lower pH by addition of a weak acid selected from the group of phosphoric acid or an organic acid.

12. The method according to claim 1, wherein the metal cyanide is ferro-cyanide.

* * * * *